WM. SLADE SEN.

WATER WHEEL.

98435

PATENTED DEC 28 1869

Witnesses.
F. Lehmann
C. L. Evert

Inventor
Wm Slade Sen.
per
Alexander Mason
Atty.

UNITED STATES PATENT OFFICE.

WILLIAM SLADE, SR., OF GUM CREEK, GEORGIA.

IMPROVEMENT IN WATER-WHEELS.

Specification forming part of Letters Patent No. 98,435, dated December 28, 1869.

*To all whom it may concern:*

Be it known that I, WILLIAM SLADE, Sr., of Gum Creek, in the county of Dooly and in the State of Georgia, have invented certain new and useful Improvements in Water-Wheels; and do hereby declare that the following is a full, clear, and exact description thereof, reference being had to the accompanying drawings, and to the letters of reference marked thereon, making a part of this specification.

The nature of my invention consists in the construction and general arrangement of a water-wheel, with swinging paddles, to obviate the lift-water.

In order to enable others skilled in the art to which my invention appertains to make and use the same, I will now proceed to describe its construction and operation, referring to the annexed drawing, in which—

Figure 1:
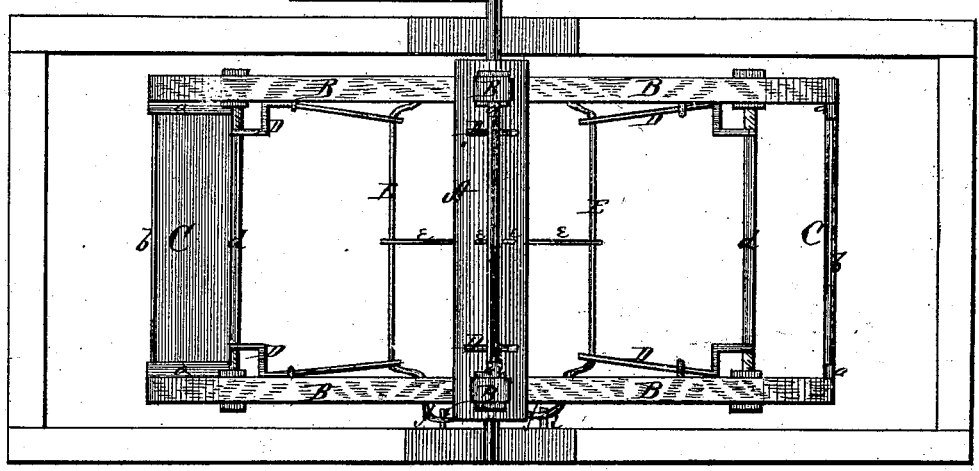
Figure 2:
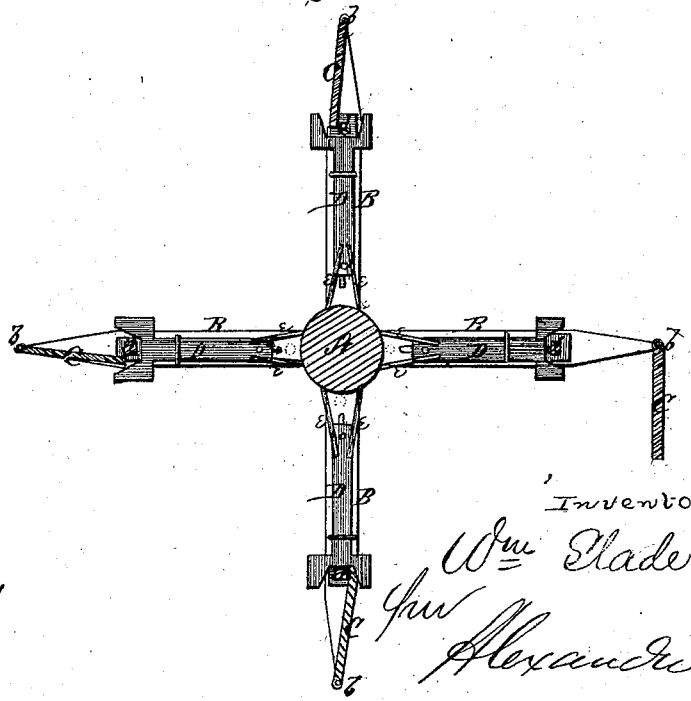

Figure 1 is a plan view, and Fig. 2 a longitudinal vertical section of my improved water-wheel.

A represents the shaft, and B B the arms of my water-wheel, made in any of the known and usual ways. The paddles C C are bound at each end with metal strips *a a*, which strips form loops at one edge of the paddle. Through these loops a rod, *b*, passes into the outer ends of the arms B B, thus hinging the paddles to the same, and allowing them to swing from side to side. Through the arms B B, at a suitable point, is passed a rod, *d*, which prevents the paddle from passing through the arms, but allows it to work on either side of them, so that in whichever direction the wheel may turn the paddles will always come right in their proper places. On the inner side of the arms B B are placed bolts D, forked at their outer ends, so as to slip on or off the paddles. These bolts are made to hold the paddles firm on either side of the arms at the proper time. The inner ends of the bolts D D are attached to a crank, E, so constructed that whenever the crank is turned in either direction it will pull the bolts off of the paddles, but will fly back again as soon as the crank is turned loose, by the action of the springs *e e*, placed on the shaft A, one on each side of the crank.

I may connect the bolts D D with the crank E by means of a chain, in which case a wire spring should be suitably placed, so as to bring the bolts back again in position.

The crank E is attached across the arms B B, near the shaft A, with the handle *f* outside of the arms, and said handle, as the wheel revolves, is made to strike three objects, *i i*, on the side of the boat, one under the center of the shaft A.

Let the wheel turn either way, the handle *f* of the crank will strike this projection, turning the crank so as to pull the bolts of the paddle just as the lift-water strikes it; then the paddle will come out of the water swinging.

The other two objects or projections on the boat are made for the same purpose—that is, to pull the bolts back, so as to let them slip on the paddles. One is made for the wheel turning forward, and the other for the wheel turning backward. They are placed on the boat on each side of the shaft, on a level with or a little above the shaft A, so that the handle of the crank will strike them, so as to turn the crank and draw back the bolts to let the paddles down, and slip over them again, ready to strike the water.

On stationary wheels, such as overshots or undershots, &c., is a plain wheel, with nothing but the shaft and arms, and the paddles are fastened by hinges or other suitable fastenings on one edge of the paddle, and then fastened across the arms, near the ends, on the side where the water strikes the paddles first. The other edge of the paddle is not fastened.

The paddle is made to work loose and easy in its fastenings, so that it will swing to and fro; then, when the water strikes the paddles, it will press them to the arms until they come to the lift-water, when the paddles will turn edgewise, and come out of the water swinging, and as soon as the paddles pass the center over head they will take their places again flat on the arms, as before, within themselves.

Having thus fully described my invention, what I claim as new, and desire to secure by Letters Patent, is—

1. The combination of the bolts D D, crank E, handle *f*, and springs *e e*, all constructed as described, and operating substantially as and for the purposes herein set forth.

2. In combination with the bolts D D, crank E, handle *f*, and springs *e e*, the projections *i*

$i$, arranged as described, to operate substantially in the manner and for the purposes herein set forth.

3. The combination and arrangement of the shaft A, arms B B, swinging paddles C C, rods $d\ d$, bolts D D, cranks E E, springs $e\ e$, handle $f$, and projections $i\ i$, all constructed and arranged as described, substantially as and for the purposes herein set forth.

In testimony that I claim the foregoing I have hereunto set my hand this 8th day of October, 1869.

WILLIAM SLADE, Sr.

Witnesses:
  JESSE W. JACKSON,
  DAVID B. MORRIS.